United States Patent
White

(10) Patent No.: US 6,324,470 B1
(45) Date of Patent: Nov. 27, 2001

(54) METHOD AND SYSTEM FOR REPRESENTING RESTRICTED DRIVING MANEUVERS

(75) Inventor: Kerry White, Hoffman Estates, IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 09/519,946

(22) Filed: Mar. 7, 2000

(51) Int. Cl.$^7$ ................................................ G06F 165/00
(52) U.S. Cl. .................... 701/209; 701/200; 701/202; 701/208; 340/990; 340/995; 707/102
(58) Field of Search .................. 701/1, 23, 25, 701/26, 200, 201, 202, 208, 209, 100, 102, 104.1; 340/990, 995

(56) References Cited

U.S. PATENT DOCUMENTS

| | | | |
|---|---|---|---|
| 4,862,373 | * | 8/1989 | Meng ..................... 701/209 |
| 4,888,698 | | 12/1989 | Driessen et al. . |
| 5,031,104 | * | 7/1991 | Ikeda et al. .......... 701/209 |
| 5,036,471 | * | 7/1991 | Tamura et al. ........ 701/209 |
| 5,041,983 | * | 8/1991 | Nakahara et al. ..... 701/209 |
| 5,072,395 | * | 12/1991 | Bliss et al. .......... 701/209 |
| 5,170,353 | | 12/1992 | Verstaete . |
| 5,513,110 | | 4/1996 | Fujita et al. . |
| 5,953,722 | | 9/1999 | Lampert et al. . |
| 5,963,956 | | 10/1999 | Smartt . |
| 5,968,109 | | 10/1999 | Israni et al. . |
| 5,974,419 | | 10/1999 | Ashby . |
| 6,122,593 | * | 9/2000 | Friederich et al. ..... 701/202 |

FOREIGN PATENT DOCUMENTS

WO 99/58934    11/1999   (WO) .

OTHER PUBLICATIONS

Samet, Hanan: "The Strategies for Optimizing the Use of Redundancy in Spatial Databases", *The Design and Analysis of Spatial Data Structures*, ISBN 0–201–50255–0, Chapter 2.4 (1996).

Matsuyama, et al.: "A file Organization for Geographic Information Systems Based on Spatial Proximity", *Computer Vision, Graphics and Image Processing* 26, 303–318. (1984).

* cited by examiner

Primary Examiner—William A. Cuchlinski, Jr.
Assistant Examiner—Gertrude Arthur
(74) Attorney, Agent, or Firm—Frank J. Kozak; Lawrence M. Kaplan

(57) ABSTRACT

A method that facilitates complying with traffic restrictions that involve three or more connected road segments when using a navigation system to determine a route. The method includes forming multiple instances of data representing each intermediate road segment between an entrance segment and an exit segment and storing data defining restrictions that apply to only two connected road segments, such that a valid driving paths exists between the entrance segment and the intermediate segment and between the intermediate segment and the exit segment, but that no valid driving paths exist between the entrance segment and the exit segment.

20 Claims, 5 Drawing Sheets

METHOD AND SYSTEM FOR REPRESENTING RESTRICTED DRIVING MANEUVERS

BACKGROUND OF THE INVENTION

The present invention relates to navigation systems and more particularly the present invention relates to a way to avoid prohibited driving maneuvers when using a navigation system to determine a route to a destination.

Navigation systems provide useful features, such as calculating a route to a desired destination and providing guidance for following the route. In order to provide these features, navigation systems use geographic data that include information about the locations of roads and intersections, estimated travel times along road segments, the speed limits along roads, etc. Using geographic data, programming algorithms used in navigation systems can find an optimal (e.g, fastest or shortest) route to a specified destination.

The geographic data used by navigation systems also include data about traffic restrictions, such as one-way streets, no-left-turns, etc., so that the navigation system can calculate a legal route (i.e., a route that conforms to applicable traffic laws and regulations). For example, FIG. 1 illustrates a simple intersection at which it is illegal to make a right turn from road "A" to road "B." In the geographic data, a data record used to represent the intersection of road A and road B may include information about this turn restriction. Similarly, if a road is a one-way street, information about this direction of travel restriction is included in the one or more data records that represent the road.

In addition to traffic restrictions that involve only two road segments, there are types of traffic restrictions that involve more than two road segments. Two examples of traffic restrictions that involve several segments (three or more segments) are shown in FIGS. 2 and 3. FIG. 2 illustrates lanes in one direction of traffic on an expressway where traffic flows from segment 2 to 3 to 4. Segment 1 represents an entrance ramp on the left, and segment 5 represents an exit ramp on the right. If segment 3 is too short to safely allow a vehicle entering the expressway on segment 1 from exiting via segment 5, traffic authorities may prohibit such a maneuver.

In FIG. 3, roads X and Y represent major arteries, while segments 5, 6, and 7 represent local roads. In many cases, a municipality will restrict drivers from taking a short cut from road X to road Y by prohibiting the sequence 1-5-6-4 and require drivers to follow the sequence 1-2-3-4. Turns are permitted into and out of the neighborhood as long as the illegal sequence is not followed.

In a navigation system, several-segment (3 or more) restricted driving maneuvers are more difficult for routing algorithms to deal with than two-segment restricted driving maneuvers. Several-segment restricted driving maneuvers require that the database include information that flags each segment in the several-segment restricted driving maneuver. Routing algorithms check every segment examined for this flag and ensure that the expanded route does not follow an illegal sequence. This becomes more complex if the routing algorithm is a two-ended A* algorithm and the several-segment restricted driving maneuver occurs where the source and destination search trees meet. Due to the complexity of implementation and extra processing required, some database compilers drop this data. Other database compilers may include it, but the in-vehicle routing application ignores it. As a result, illegal routes may be generated even when the data exists to prevent such routes.

Accordingly, there is a need for an improved means to handle several-segment restricted driving maneuvers.

SUMMARY OF THE INVENTION

To address these and other objectives, the present invention comprises a method that facilitates complying with traffic restrictions that involve three or more connected road segments when using a navigation system to determine a route. The method includes forming multiple instances of data representing each intermediate road segment between an entrance segment and an exit segment and storing data defining restrictions that apply to only two connected road segments, such that a valid driving paths exists between the entrance segment and the intermediate segment and between the intermediate segment and the exit segment, but that no valid driving paths exist between the entrance segment and the exit segment.

The present invention also includes a geographic database that embodies the described method for representing restricted driving maneuvers that involve three or more connected road segments, wherein the geographic database is stored on a computer-readable medium.

DETAILED DESCRIPTION OF THE PRESENTLY PREFERRED EMBODIMENTS

Figure 1:
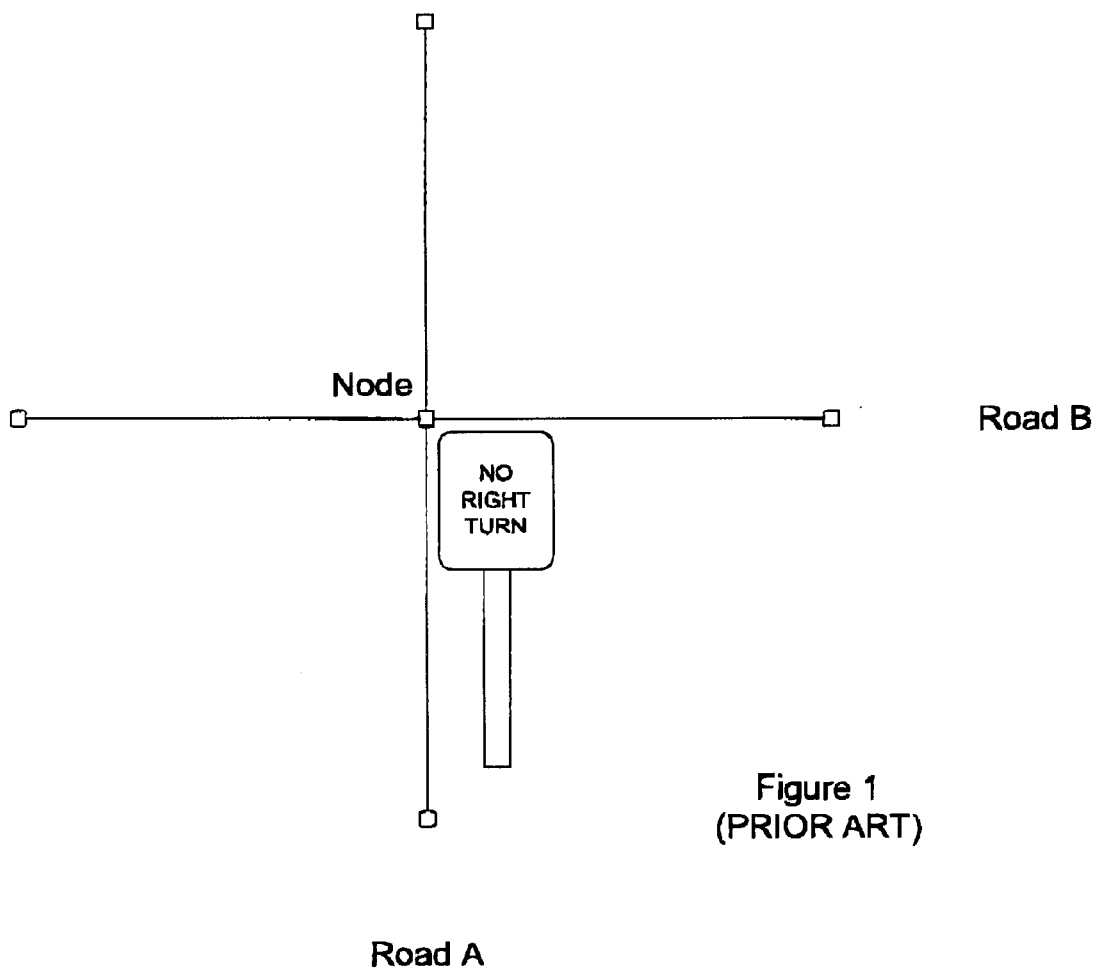
FIG. 1 is an illustration of an intersection having a turn restriction.
Figure 2:
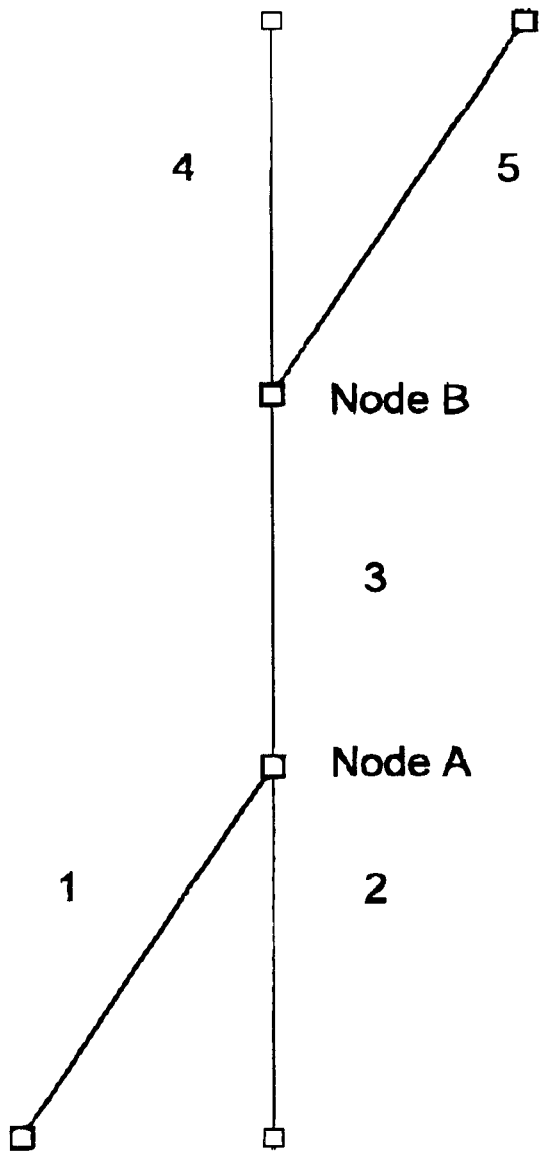
FIG. 2 illustrates a location that has a several-segment restricted driving maneuver wherein a section of an expressway has an entrance ramp on the left closely followed by an exit ramp on the right.
Figure 4:
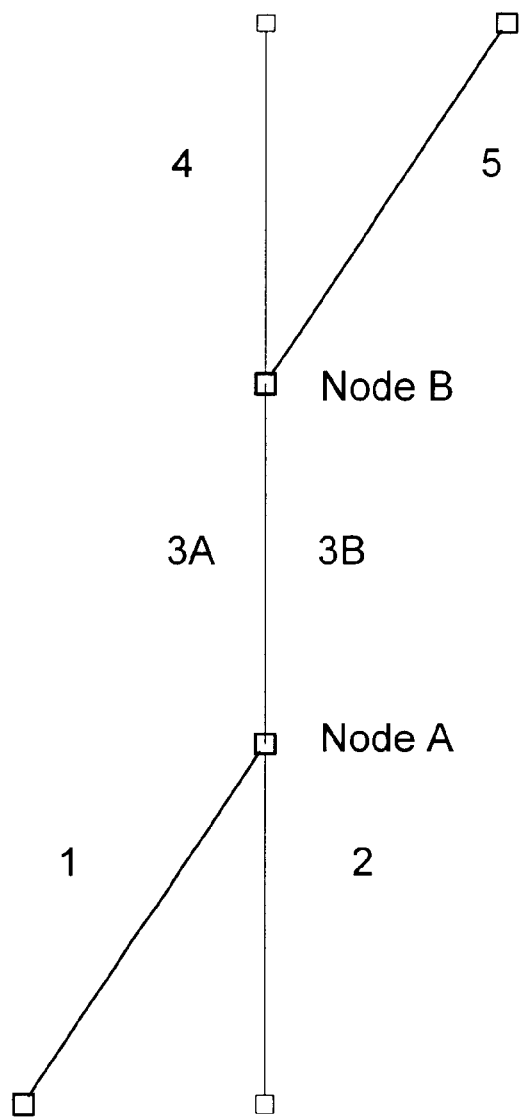
FIG. 4 illustrates the location of FIG. 2 with the inclusion of additional data for representing the several-segment restricted driving maneuver.

A solution to the problem of handling several-segment restricted driving maneuvers can be achieved by creating multiple instances of segments between the first and last segment of a several-segment restricted driving maneuver. Then, simple turn-restrictions like the one in FIG. 1 can be defined to satisfy the several-segment restriction. Furthermore, no extra functionality in the routing algorithm is needed to check for several-segment restricted driving maneuvers. To illustrate, reference is made to FIG. 4 that shows the same portion of expressway as shown in FIG. 2. In FIG. 4, the piece of road represented in FIG. 2 by segment 3 is replaced by two nearly identical segments that differ only in the access restriction attributes. For the example of FIG. 4, the two instances of segment 3 are renamed "3A"

and "3B." Simple turn restrictions are then assigned as follows.

| Illegal | Legal |
|---------|-------|
| 1-3B    | 1-3A  |
| 3A-5    | 2-3B  |
| 3A-3B   | 3A-4  |
| 3B-3A   | 3B-4  |
|         | 3B-5  |

As a result, there is no way to get from segment 1 to segment 5.

Figure 3:
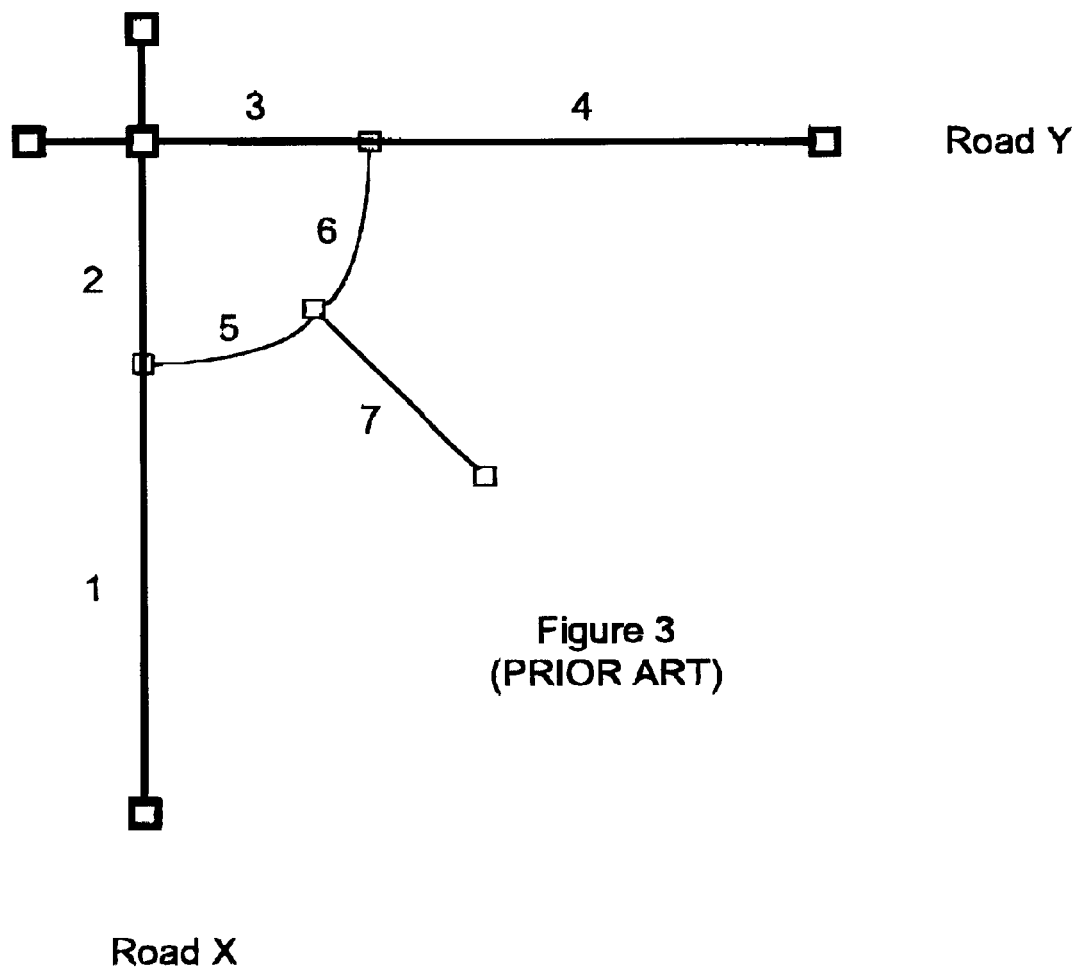
FIG. 3 illustrates another location that has a several-segment restricted driving maneuver wherein minor roads provide a potential shortcut between an intersection of major roads.
Figure 5:
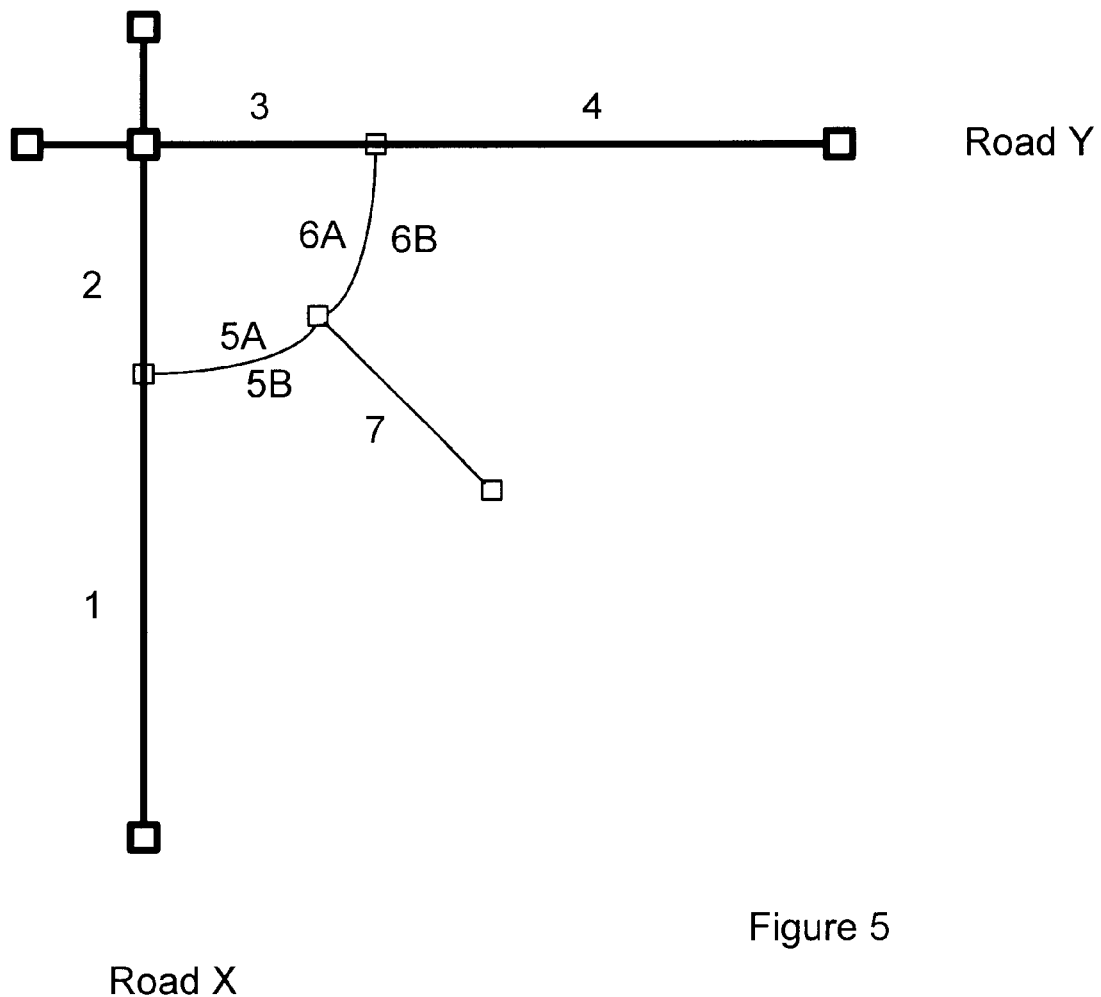
FIG. 5 illustrates the location of FIG. 3 with the inclusion of additional data for representing the several-segment restricted driving maneuver.

The example of FIG. 3 can be treated similarly. FIG. 5 shows the same portion of expressway as shown in FIG. 3, except that there are two segments between the start and end segment of the restricted driving maneuver. In FIG. 5, two instances of segments 5 and 6 are created and the following simple turn restrictions are assigned.

| Illegal | Legal |
|---------|-------|
| 1-5B    | 1-2   |
| 5A-6B   | 1-5A  |
| 6A-4    | 2-3   |
| 5A-5B   | 3-4   |
| 5B-5A   | 5A-6A |
| 6A-6B   | 5A-7  |
| 6B-6A   | 5B-6B |
|         | 5B-7  |
|         | 6B-4  |

Again, using this representation, there is no legal path from segment 1 to segment 4 via segments 5 and 6. Yet it is still possible to route from segment 5 to segment 4 for local traffic using segment 5B and segment 6B.

The present embodiment can be used with any type of routing algorithm including the A* algorithm. The present embodiment can also be used with one-ended searches, two-ended searches, etc. Because simple turn-restrictions are handled routinely by routing algorithms, there is no extra processing required and no negative effect on route performance. The only cost is the space necessary to store multiple copies of the same segment.

It is intended that the foregoing detailed description be regarded as illustrative rather than limiting and that it is understood that the following claims including all equivalents are intended to define the scope of the invention.

I claim:

1. A method of representing restricted driving maneuvers that involve several connected road segments for a geographic database, wherein the several connected segments include at least three connected road segments, and wherein said several connected road segments include an entrance road segment, an exit road segment and at least one intermediate road segment, and wherein continuous travel from the entrance road segment onto the exit road segment via the intermediate road segment is prohibited, the method comprising:

forming an instance of data representing the entrance road segment;

forming an instance of data representing the exit road segment; and forming multiple instances of data representing the intermediate road segment, wherein a first of said multiple instances of data representing the intermediate road segment can be used to determine a valid driving path from the entrance road segment to the intermediate road segment but cannot be used to determine a valid driving path from the intermediate road segment onto the exit road segment, and wherein a second of said multiple instances of data representing the intermediate road segment can be used to determine a valid driving path from the intermediate road segment to the exit road segment but cannot be used to determine a valid driving path from the entrance road segment onto the intermediate road segment.

2. The method of claim 1 further comprising:

using a two-ended route searching algorithm with said geographic database.

3. The method claim 1 further comprising:

using a one-ended route searching algorithm with said geographic database.

4. The method of claim 1 further comprising:

using an A* route searching routine with said geographic database.

5. A database product that represents restricted driving maneuvers that involve several connected road segments, wherein the several connected segments include at least three connected road segments, and wherein said several connected road segments include an entrance road segment, an exit road segment and at least one intermediate road segment, and wherein continuous travel from the entrance road segment onto the exit road segment via the intermediate road segment is prohibited, wherein the database product comprises:

an instance of data representing the entrance road segment;

an instance of data representing the exit road segment; and multiple instances of data representing the intermediate road segment, wherein a first of said multiple instances of data representing the intermediate road segment can be used to determine a valid driving path from the entrance road segment to the intermediate road segment but cannot be used to determine a valid driving path from the intermediate road segment onto the exit road segment, and wherein a second of said multiple instances of data representing the intermediate road segment can be used to determine a valid driving path from the intermediate road segment to the exit road segment but cannot be used to determine a valid driving path from the entrance road segment onto the intermediate road segment.

6. In a geographic database, a method of representing restricted driving maneuvers that involve three or more connected road segments, the method comprising:

forming multiple instances of data representing each intermediate road segment between an entrance road segment and an exit road segment; and storing data defining restrictions that apply to only two connected road segments, such that valid driving paths exist between the entrance road segment and the intermediate road segment and between the intermediate road segment and the exit road segment, but no valid driving path exists between the entrance road segment and the exit road segment.

7. The method of claim 6 further comprising:
using a two-ended route searching algorithm with said geographic database.

8. The method of claim 6 further comprising:
using an A* route search routine with said geographic database.

9. A database product that represents restricted driving maneuvers that involve three or more connected road segments, wherein said database product is stored on a computer readable medium, wherein said database product comprises:
multiple instances of data representing each intermediate road segment between an entrance road segment and an exit road segment; and
data defining restrictions that apply to only two connected road segments, such that valid driving paths exist between the entrance road segment and the intermediate road segment and between the intermediate road segment and the exit road segment, but no valid driving path exists between the entrance road segment and the exit road segment.

10. In a geographic database, a method of representing restricted driving maneuvers that involve three or more connected road segments, the method comprising:
forming multiple instances of data representing each intermediate road segment between an entrance road segment and an exit road segment;
storing data defining restrictions that apply to only two connected road segments,
wherein said data defining restrictions indicates that a valid driving path exists from the entrance road segment to the intermediate road segment as represented by a first of said multiple instances of data and that a valid driving path exists to the exit road segment from the intermediate road segment as represented by a second of said multiple instances of data, but that a valid driving path does not exist from the entrance road segment to the intermediate road segment as represented by the second of said multiple instances of data and that a valid driving path does not exist to the exit road segment from the intermediate road segment as represented by the first of said multiple instances of data.

11. A database product that represents restricted driving maneuvers that involve three or more connected road segments, wherein the database product comprises:
multiple instances of data representing each intermediate road segment between an entrance road segment and an exit road segment;
data defining restrictions that apply to only two connected road segments,
wherein said data defining restrictions indicates that a valid driving path exists from the entrance road segment to the intermediate road segment as represented by a first of said multiple instances of data and that a valid driving path exists to the exit road segment from the intermediate road segment as represented by a second of said multiple instances of data, but that a valid driving path does not exist from the entrance road segment to the intermediate road segment as represented by the second of said multiple instances of data and that a valid driving path does not exist to the exit road segment from the intermediate road segment as represented by the first of said multiple instances of data.

12. The method of claim 11 further comprising:
using a two-ended route searching algorithm with said geographic database.

13. The method of claim 11 further comprising:
using an A* route searching algorithm with said geographic database.

14. In a geographic database, a method of representing a restricted driving maneuver that involves at least three connected road segments,
wherein the at least three connected road segments include an entrance road segment, an exit road segment, and one or more intermediate road segments, and
wherein continuous travel onto the exit road segment from the entrance road segment via the one or more intermediate road segments is prohibited;
wherein the method comprises:
for each one of the one or more intermediate road segments, representing said intermediate road segment with plural data records, wherein a first of said plural data records contains data indicating travel onto the intermediate road segment represented by said data record from the entrance road segment is permitted, but that travel onto the exit road segment from the intermediate road segment represented by said data record is prohibited, and wherein a second of said plural data records contains data indicating travel onto the intermediate road segment represented by said data record from the entrance road segment is prohibited, but that travel onto the exit road segment from the intermediate road segment represented by said data record is permitted.

15. The method of claim 14 wherein the entrance road segment and the exit road segment are major streets and the one or more intermediate road segments are minor streets that form an illegal shortcut from the entrance road segment and the exit road segment.

16. The method of claim 14 wherein the one or more intermediate road segments form an illegal bypass of an intersection of the entrance road segment and the exit road segment.

17. The method of claim 14 wherein the entrance road segment is an entrance ramp leading onto one of the one or more intermediate road segments and the exit road segment is an exit ramp from the one or more intermediate road segments and wherein the exit ramp is located on an opposite side of the one or more intermediate road segments from the entrance ramp.

18. A geographic database formed to represent restricted driving maneuvers that involve at least three connected road segments wherein the at least three connected road segments include an entrance road segment, an exit road segment, and one or more intermediate road segments, and wherein continuous travel onto the exit road segment from the entrance road segment via the one or more intermediate road segments is prohibited, wherein the geographic database product comprises:
for each one of the one or more intermediate road segments, plural data records representing said intermediate road segment,
wherein a first of said plural data records contains data indicating travel onto the intermediate road segment represented by said data record from the entrance road segment is permitted, but that travel onto the exit road segment from the intermediate road segment represented by said data record is prohibited, and wherein a second of said plural data records contains data indicating travel onto the intermediate road segment represented by said data record from the entrance road segment is prohibited, but that travel onto the exit road segment from the intermediate road segment represented by said data record is permitted.

19. A method of forming a navigable database comprising:

identifying locations at which travel onto a third road segment from a first road segment via a second road segment is physically possible but legally prohibited;

representing the first road segment with a first data record;

representing the third road segment with a second data record;

representing the second road segment with a third data record and a fourth data record, and wherein said database contains data indicating that travel onto the road segment represented by the third data record from the road segment represented by the first data record is permitted, but that travel onto the road segment represented by the second data record from the road segment represented by the third data record is prohibited, wherein said database contains data indicating that travel onto the road segment represented by the fourth data record from the road segment represented by the first data record is prohibited, but that travel onto the road segment represented by the second data record from the road segment represented by the fourth data record is permitted.

20. A database product that represents locations at which travel onto a third road segment from a first road segment via a second road segment is physically possible but legally prohibited, the database product comprising:

a first data record that represents the first road segment;

a second data record that represents the third road segment;

a third data record and a fourth data record that represent the second road segment, and data indicating that travel onto the road segment represented by the third data record from the road segment represented by the first data record is permitted, but that travel onto the road segment represented by the second data record from the road segment represented by the third data record is prohibited, data indicating that travel onto the road segment represented by the fourth data record from the road segment represented by the first data record is prohibited, but that travel onto the road segment represented by the second data record from the road segment represented by the fourth data record is permitted.

* * * * *